United States Patent [19]

Collender

[11] Patent Number: 4,676,613

[45] Date of Patent: Jun. 30, 1987

[54] STEREOSCOPIC PICTURES USING ASTIGMATIC LOW F-NUMBER PROJECTION LENSES-METHOD AND APPARATUS

[76] Inventor: Robert B. Collender, 709 Peterson Ave., Glendale, Calif. 91203

[21] Appl. No.: 890,636

[22] Filed: Jul. 30, 1986

[51] Int. Cl.$^4$ ............................................. G03B 35/00
[52] U.S. Cl. ...................................... 352/58; 350/129
[58] Field of Search ........................... 352/58; 350/129

[56] References Cited

U.S. PATENT DOCUMENTS

| | | | |
|---|---|---|---|
| 1,882,424 | 10/1932 | Ives | 352/58 |
| 1,883,291 | 10/1932 | Ives | 350/129 |
| 1,918,705 | 7/1933 | Ives | 352/58 |
| 1,937,118 | 11/1933 | Ives | 352/61 |
| 3,201,797 | 8/1965 | Roth | 350/129 |
| 3,482,913 | 12/1969 | Glenn | 352/58 |
| 4,089,597 | 5/1978 | Collender | 352/58 |
| 4,547,050 | 10/1985 | Collender | 352/58 |

Primary Examiner—Monroe H. Hayes

[57] ABSTRACT

My invention is a threee-dimensional motion picture capture and reproduction method and apparatus that allows multiple viewers to simultaneously watch the reproduction of recorded or real time 3-D pictures without the need for any special optical aids at their eyes. The playback system is compatible with all current forms of film format, television cameras, video recorders and computer graphic signls and synthesizes three-dimensional images from several lateral vantage points in the scene. Scene capture is achieved by computer graphic synthesis, a single translating camera, a few cameras or multiple stationary cameras. The playback equipment consists or multiple stationary projectors with active (light emitting) image planes, astigmatic low f-number projection lenses and a semi-specular screen. The screen vertically scatters the light and either horizontally retro-reflects or plane-mirror reflects the projected light. All projectors project images simultaneously and light projected from any point in the image plane is focused in the vertical plane to vertically scatter but is imaged toward infinity by the projection astigmatic lens horizontally. Parallel light from a distant point is continuous across the screen due to adjacent lateral contiguous lens placement.

13 Claims, 9 Drawing Figures

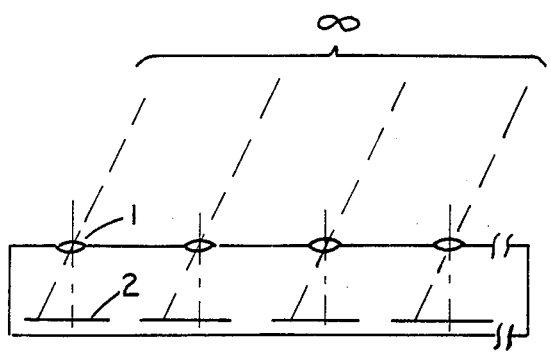
FIG. 1
FIG. 2
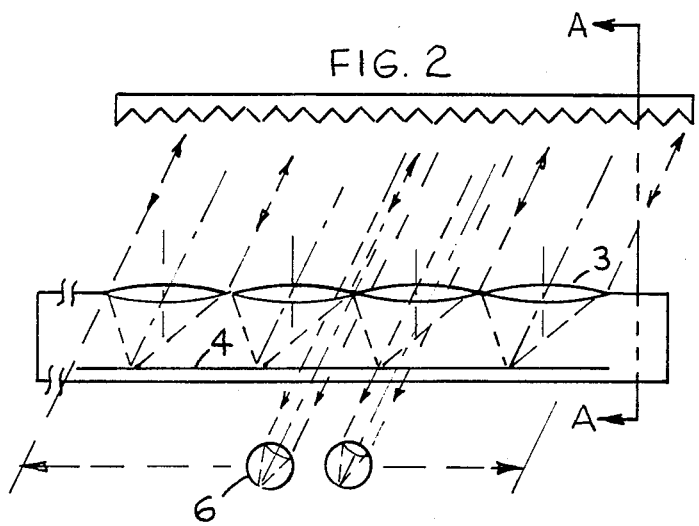
FIG. 3
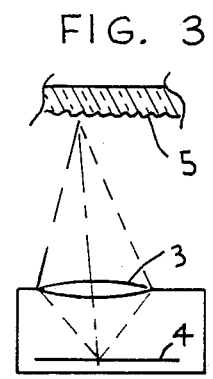
SEC A-A
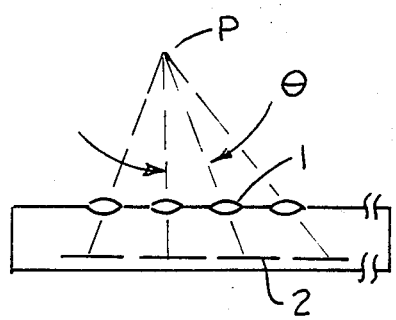
FIG. 4
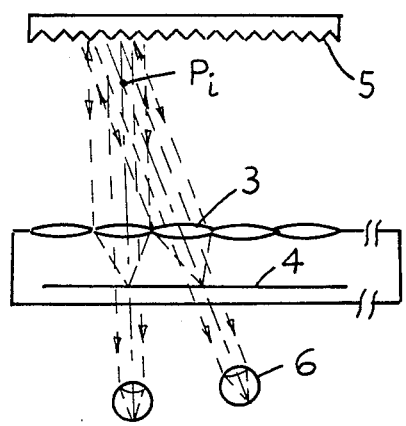
FIG. 5

STEREOSCOPIC PICTURES USING ASTIGMATIC LOW F-NUMBER PROJECTION LENSES-METHOD AND APPARATUS

CROSS REFERENCES TO RELATED APPLICATIONS

With reference to my previous U.S. Pat. Nos. 4,089,597 dated May 16, 1978 and 4,547,050 dated Oct. 15, 1985, my new invention is significantly different. In the old system the projector utilized a central stationary lamp on the rotation axis of moving projectors that radially projected successive views with changing horizontal perspective. The projector's effective f-number was very high so that a narrow vertical exit slit of light moved horizontally across the viewing field when the projected views horizontally reflected and vertically scattered from a semi-specular concaved cylindrical projection screen. Because the radially scanned projection axis was transformed by the screen into a parallel translating projection axis, images appeared continuous across the horizontal view-field even though scenes acquired for horizontal parallax viewing were taken at distinct and separate spatial locations horizontally displaced from one another.

My new invention uses all-static components while delivering motion pictures and computer graphics extending from near the observer's eyes to infinity. Multiple projectors are arranged ineither a linear or circular array. The projection lamp and condensing lens elements are replaced by an active light emitting image plane. The horizontal field of view has been increased and can be extended up to 360 degrees. The stationary projection lenses are low f-number astigmatic and butt-together horizontally. A common distant object point is imaged as a continuous band of parallel light extending across the entire width of the screen. Projection light is focused toward infinity horizontally and converged to the screen vertically. The screen returns the parallel light to the eye and stereopsis is achieved by providing correct angular relationships to each eye from any given scene point.

Herbert E. Ives, in U.S. Pat. No. 1,937,118 dated Nov. 28, 1933, uses a horizontally ribbed screen surface. Projected rays are incident on vertical lenticules in front of the screen which then focus on the ribbed screen beyond the lenticules. The only way the Ives's system will work without astigmatic projection is to focus the images on the screen. His projection lenses were on the order of two inches wide and therefore would not correctly return off-axis projected rays making up a convergence cone of rays for the image point on the film aligned with the lens node. My new invention circumvents the problem imposed by the Ives patent by making all rays parallel leaving the projection lens as viewed in a plan view of the projection system. In this case, all returning rays from the screen for any given point will be incident on the observer's eyes as a parallel bundle. Focus of all rays leaving the lens as viewed in a side elevation view of the projection system, assures that the image will be focused on the observer's retina. Stereopsis occurs when the observer's eyes see a given scene image-point from a different perspective dictated by the relative displacement of original cameras in the scene captured. The lenticules in Ives patent can be eliminated and a simple horizontally ribbed semi-specular screen can be used alone for systems with a linear array of projectors. Hence, a prime source of front surface reflection is eliminated. For projection systems having a curved array of projectors, a retro-reflecting screen as described in Herbert E. Ives U.S. Pat. No. 1,883,291 dates Oct. 18, 1932 can be used. The new patent concept of astigmatic projection lenses of low f-number also apply to the curved array of projectors.

BRIEF SUMMARY OF THE INVENTION

My invention relates to a system of recording and stereoscopic viewing of scenes and particularly to a method and means for accomplishing this purpose without viewing aids at the eyes of the observers.

Man has sought for decades to reproduce scenes in stereoscopy without the use of viewing aids at the eyes of the observers and in a manner such that a number of persons might view such scenes at one time and without restriction as to their various individual positions. In my invention, vertical parallax is eliminated and horizontal parallax may be acquired by: multiple cameras; a single translating camera; a fixed camera looking at a scene pass by or a scene on a turn table; a few cameras with interpolated systheses of missing in-between views captured; synthesized views of computer graphics from multi-display ports or a single display port if a single translating image acquiring vantage point is used.

The uniqueness of the invention resides in the projection system and screen. Multiple contiguous projectors are provided with effective buttable lenses of low f-number. All projected image points leave the projector parallel as viewed in a plan view and converge to the screen in the side elevation view. Because of the continuous emitted light from the projector array and the horizontally retro-reflective and vertically scattering properties of the semi-specular screen, observers eyes are given a smooth transition in image viewing as they move across the view-field. Stereoscopic viewing of any scene object point is provided by synthesizing the angular differences required by the observer's two eyes from the variable angles provided in the captured array of horizontally displaced camera positions. The vertically scattering semi-specular screen can be either horizontally retro-reflecting or plane mirror reflecting for linear projection arrays or horizontally retro-reflecting for curved projection arrays.

Accordingly, I am able to present a stereoscopic view of a screne to one or any reasonable number of viewers. If any or all of the viewers walk around my apparatus they will see the scene in different aspect, just as though they walked around the same scene in real life.

An object of my invention is to provide viewing of three dimensional images without the use of viewing aids at the eyes of the observer.

Another object is to provide a stereoscopic system in which various perspectives of the scene viewed may be obtained by changing one's position around the reproducing apparatus.

Another object is to provide a basic stereoscopic motion picture method applicable to known and existing forms of image acquiring processes.

Another object is to provide means for reproducing stereoscopic images that are relatively rugged and are suited to retain adjustment in practice.

Other objects will become apparent upon reading the following detailed specification and upon examining the accompanying drawings, in which are set forth by way of illustration and example certain embodiments of my invention.

BRIEF DESCRIPTION OF ALL DRAWINGS

FIG. 1 shows how scenes are photographed or televised from multi-cameras with objects at great range.

FIG. 2 shows a plan view of a projection embodiment of my invention, with the scene of FIG. 1 played back against a retro-reflecting screen and viewed by an observer.

FIG. 3 is a side view of FIG. 2.

FIG. 4 shows how scenes are photographed or televised from multi-cameras with objects at close range.

FIG. 5 shows how the projection embodiment of FIG. 2 plays back the scene of FIG. 4.

DETAILED DESCRIPTION OF DRAWINGS

Figure 6:
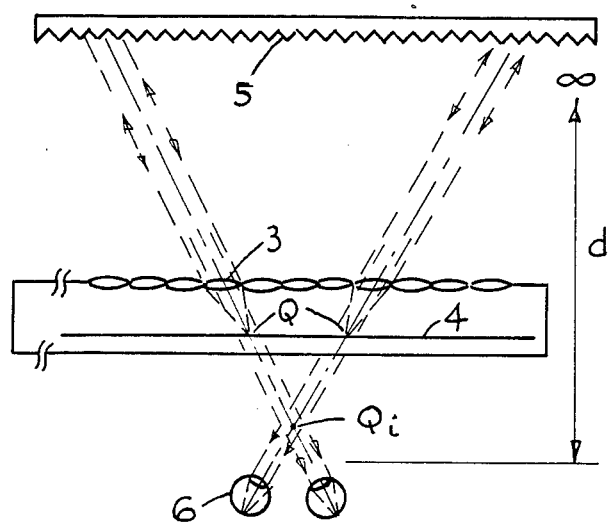
FIG. 6 shows how the geometry of the projection system can be used to identify very close computer graphic images for the observer.

FIG. 1 shows how multi-cameras having lens 1 and sensitive image plane 2 will record an infinite object point at the same relative position on each image plane 2.

FIG. 2 shows an embodiment of the playback system of my invention using a retro-reflective screen 5 as described in H. E. Ives U.S. Pat. No. 1,883,291 dated Oct. 15, 1932. The quantity and relative location of each projector in the projector array (or several projection systems) is identical to the cameras of FIG. 1. Each projector is made of lens 3 and electronically driven light emitting image plane 4. There is no need for projection lamps and associated condensing optics for each projection system in the projector array. The technology used for image plane 4 is recommended to be Microbead. The Mocrobead construction is fully described in Allen Davidson's U.S. Pat. No. 4,563,617 dated Jan. 7, 1986 entitled Flat Panel Television/Display. The Microbead image plane is fabricated by laser welding incandescent tungsten particles together to form light emitting microbeads, the ends of which are simultaneously welded to driving electrodes. The small physical mass and dimensions of each bead permit it to be fired to an incandescent state at high rates (about 40 microseconds), becoming a controllable, bright, point source of light suitable as a picture element to create moving images. The beads are suspended between a heat resistant substrate and faceplate, both of which contain depressions proximate to each bead to provide thermal spacing and optical and thermal reflectivity to direct visible light out of the panel and heat back to the bead, conserving power. Color filters provide full color image display in a system operating at approximately five volts.

Other light emitting projection systems may also be employed in my invention such as laser projection and cathode ray tubes. Electronically and optically driven spatial light modulators (either transmissive or reflective) and film requring a separate light source, can also be used. Since the imaging plane does not move during viewing of the stereoscopic scenes, memory in the image plane is not required. A sequential spot scanner is adequate.

In FIG. 2, light from the image point leaves each projector in a broad swath of parallel light which remains parallel after reflecting from the screen 5. This returning light enters eyes 6 and focuses to $P_i$ on the retina.

FIG. 3 shows a side view of FIG. 2. Lens 3 images parallel light in FIG. 2 while in the side view (FIG. 3), the same light converges to screen 5. Hence, the projection lens 3 is an astigmatic lens and has a practical f-number of 1. The astigmatic projection lens can be thought of as made up of a spherical component and a cylindrical component arranged with the elements of the cylinder lens vertical. Without the cylindrical component, the spherical component would focus the cone of rays for an arbitrary image point directly on screen 5. With the cylindrical component, the focusing of the cone viewed from the side as shown in FIG. 3 is unchanged but the combined effect of both cylinder and spherical lenses would make the plan view rays parallel as shown in FIG. 2. The astigmatic lens 3 then has a shorter focal length when viewed from the plan view of FIG. 2 than the focal length orthogonal to that of FIG. 2 and shown in the side view of FIG. 3.

The resultant screen image as seen by each of the observer's eyes is made up of vertical image sectors each occuring as a result of the presence of any given projector in the projector array. Screen 5 is ribbed horizontally to scatter incident light vertically on one of the two vertically elongated 90 degree highly specular mirror surfaces of each retro-reflector in screen 5. This scatter effect means that any eye 6 at any elevation in the horizontally returned swath of light will see the imaged point on the screen. Although FIG. 2 shows a linear projection array and screen, the array and screen may also be concaved to the viewers.

FIG. 4 shows the camera of FIG. 1 recording an object P at close range where the minimum angular resolution is $\theta$ from adjacent cameras having lens 1 and sensitive image plane 2.

FIG. 5 is a plan view of the same embodiment of the projection system of my invention as shown in FIG. 2 while projecting the close range image point captured of the close range object by the camera array of FIG. 4. At least two projectors are involved with lens 3 and image plane 4. The location of the image point on image plane 4 and the lens 5 node and adjacent lens spacing determine the image convergence angle seen by the observer's two eyes 6.

FIG. 6 shows a plan view of the same projector system embodiment of FIG. 2. In FIG. 6, the means is shown whereby computer graphics imagery such as arbitrary point $Q_i$ could be plotted onto image plane 4 at Q by drawing lines from the eyes 6 through the node of lens 3. Light emitted by image plane 4 is imaged by lens 3 and retro-reflects from screen 5 to the observer's eyes 6. Images then occupy space d from near the eyes to infinity.

Figure 7:
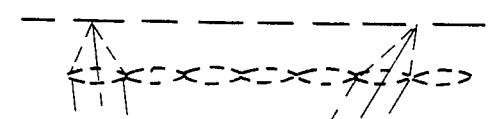
FIG. 7 shows a plan view of another embodiment of my invention using a simple horizontally ribbed semi-specular screen to maintain the parallelism of any image point as viewed in a horizontal plane.
Figure 7:
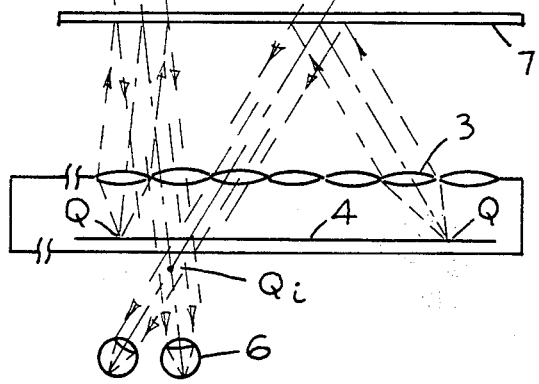

FIG. 7 shows a plan view of another embodiment according to my invention which is identical to FIG. 2 except for the screen 7. Screen 7 with a highly specular surface is a horizontally ribbed screen that horizontally reflects light as a plane mirror but vertically scatters incident projected light because of the ribbed surface. In this approach, the lens array appears as a virtual image behind the screen. H. E. Ives U.S. Pat. No. 1,883,291 dated Oct. 18, 1932 points out that a problem exists with the retro-reflecting screen 5 in that the percentage of incident light returning from the screen in a true retro-reflective mode varies with the angle of incidence so that when the field angle is near 90 degrees the screen does not perform well as retro-reflector. The practical limit for a field angle on linear arrays with retro-reflecting screens is about 60 degrees where a little less than half of the light is returned. To circumvent this problem and allow all of the projected light to return for any projected field angle, the simple screen 7 is provided. Although proximity with natural scenes is farther from the viewer, close proximity to computer graphics imagery can be maintained as shown by the ray trace for image point $Q_i$ in FIG. 7. The resultant image as seen by each of the observer's eyes is made up of vertical image sectors each occuring as a result of the presence of any given projector in the projector array.

Figure 8:
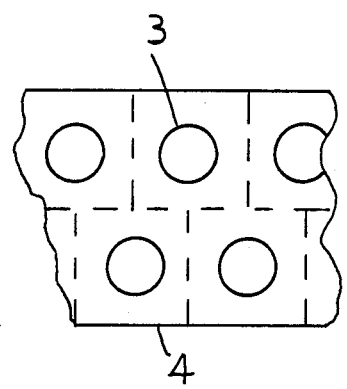
FIG. 8 shows a front view of FIG. 7 where projection lenses have been staggered in physically non-interfering locations in order to allow the effect of wide open contiguous lenses.

FIG. 8 is a front view of FIG. 7 showing how a space is required between astigmatic lenses 3 even with f-numbers as low as unity when it is necessary to provide a continuously open horizontal field across the entire width of the screen. To accomplish the contiguous placement of lenses 3 as viewed from the plan view of FIG. 7, FIG. 8 shows a staggering of alternate lenses 3 where a slight downward image-shift from the projected images in the top row of lenses 3 and a corresponding slight upward image shift from the projected images in the bottom row of lenses 3 will bring the images into alignment vertically on the screen 7.

Figure 9:
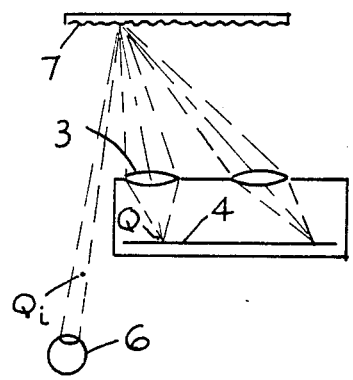
FIG. 9 shows a side view of FIG. 7.

FIG. 9 shows a side view of FIG. 7 where the upper and lower row of lenses 3 are both required to converge image points onto screen 7. The vertical scattering by the horizontal ribbing of screen 7 allows an arbitrary eye 6 to see the image point from the proper direction.

Because the screen 7 is relatively far from the eye 6, the returning cone of rays is very narrow and the image on the retina about where the infinity parallel rays focus for the plan view of FIG. 7. The astigmatic projection lens then does not cause a noticable asticable astigmatic viewing situation. The resultant close proximity Q image is in focus with distant objects when viewed by a single eye but when both eyes converge on Q due to the projector's cue of convergence angle from both eyes to the image Q, then the background will also be in focus. The observer's eyes then see a much greater depth of field than in natural viewing.

Having thus fully described my invention and the manner in which it is to be practiced, I claim:

1. A method of recording and reproducing stereoscopic viewing for observation by observers without visual aids at the eyes of the observers, comprising:
   a. capturing several views from different lateral points;
   b. placing the several views obtained in several projection systems;
   c. relating a given view to a given projection system;
   d. projecting a plurality of the given views simultaneously onto a screen from said several projection systems;
   e. causing any given point in the image plane of any given projector in said several projection systems to focus at infinity as viewed in a horizontal plane and to converge to said screen as viewed in a vertical plane;
   f. making the projection lens of any projector in said several projection systems of low f-number;
   g. arranging the projectors in said several projection systems contiguously in a horizontal plane;
   h. causing a common point in said image plane of said projection lenses in said several projection systems to emit continuous parallel rays across said several projector systems;

whereby simultaneous viewing by an observer of said screen reflected rays from said several projector systems generates stereoscopic pictures for said observers.

2. The method of claim 1, wherein said screen is horizontally retro-reflective and scatters light vertically.

3. The method of claim 1, wherein said screen and said several projection systems are arranged in a straight line.

4. The method of claim 2, wherein said screen and said several projection systems are arranged concaved to said observers.

5. Apparatus for displaying motion pictures stereoscopically to observers situated in front of a viewing screen, said apparatus including:
   a. an array of projectors arranged in a horizontal plane;
   b. each said projector having an image format;
   c. each said projector having an astigmatic projector lens of low f-number;
   d. means to direct images from said image format through the optics of each said projector;
   e. said image format being of sufficient brightness to cause a visible image to appear on said screen when projected by any of said projectors in said array;
   f. said screen being flat and having horizontal reflection and vertical scatter properties;

whereby the magnified reflected image format from each projector appears in adjacent vertical image sectors to provide a continuous stereoscopically related view for each said observer's eye.

6. The apparatus of claim 5, wherein said image format comprises an active light emitting surface.

7. The apparatus of claim 5, wherein said image format comprises a transmissive spatial light modulator.

8. The apparatus of claim 5, wherein said image format comprises a relative spatial light modulator.

9. The apparatus of claim 5, wherein said image format comprises film.

10. The apparatus of claim 5, wherein the screen retro-reflects light horizontally and scatters light vertically.

11. The apparatus of claim 5, wherein said projector array and a horizontally retro-reflective and vertically scattering screen are arranged concaved to said observers.

12. The apparatus of claim 5, wherein said screen comprises a horizontal brushed piece of stainless steel.

13. The apparatus of claim 5, wherein said screen comprises specular shaped embossed cylindrical ribs extending horizontally.

* * * * *